US009118758B1

(12) United States Patent
Zhou et al.

(10) Patent No.: US 9,118,758 B1
(45) Date of Patent: Aug. 25, 2015

(54) USER FEEDBACK ON CALLS

(75) Inventors: Jian Zhou, Milpitas, CA (US); Anshul Kothari, Sunnyvale, CA (US); Surojit Chatterjee, Fremont, CA (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 13/225,624

(22) Filed: Sep. 6, 2011

(51) Int. Cl.
*H04M 1/64* (2006.01)
*H04M 3/487* (2006.01)

(52) U.S. Cl.
CPC ............ *H04M 3/487* (2013.01); *H04M 3/4878* (2013.01)

(58) Field of Classification Search
CPC ................. H04M 2201/38; H04M 2203/2083; H04M 2215/0192; H04M 3/42178; H04M 3/4878; H04M 3/487
USPC ............... 379/67.1, 76, 88.19, 88.22, 213.01; 455/414.1; 705/7.35; 704/265
See application file for complete search history.

(56) References Cited

U.S. PATENT DOCUMENTS

| 6,009,150 | A | * | 12/1999 | Kamel ....................... 379/88.22 |
| 6,934,684 | B2 | * | 8/2005 | Alpdemir et al. ............. 704/265 |
| 2001/0014145 | A1 | * | 8/2001 | Kamel et al. ................ 379/88.19 |
| 2008/0119174 | A1 | * | 5/2008 | Farkas et al. ................ 455/414.1 |
| 2009/0168987 | A1 | * | 7/2009 | Bookstaff et al. ......... 379/213.01 |
| 2009/0254409 | A1 | * | 10/2009 | Kozhukh ......................... 705/10 |
| 2009/0325547 | A1 | * | 12/2009 | Nath et al. .................. 455/414.1 |

* cited by examiner

*Primary Examiner* — Md S Elahee
(74) *Attorney, Agent, or Firm* — Fish & Richardson P.C.

(57) ABSTRACT

Various methods, systems, and computer program products are disclosed for determining relevance of a promotional message based on caller feedback. The method may include receiving at least one phone call, the at least one phone call indicating a phone number that was called to make the at least one phone call. The method may include associating the at least one phone call with a promotional message or promotional message group via the phone number, the promotional message group comprising one or more promotional messages. The method may include receiving feedback that indicates a user experience associated with the at least one phone call. The method may include determining a relevance of the promotional message or promotional message group based on the received feedback.

20 Claims, 3 Drawing Sheets

USER FEEDBACK ON CALLS

FIELD OF THE INVENTION

The disclosure relates to communicating promotional messages to computing device(s) and in particular to determining relevance of a promotional message based on caller feedback.

BACKGROUND OF THE INVENTION

Conventional systems typically determine relevance (i.e., interest by a target audience or user) of a promotional message based on various factors including whether the promotional message was selected, such as clicked, by the target. However, conventional systems fail to leverage caller experience to determine relevance of promotional messages. For example, conventional systems fail to include information collected after a phone call has been made to enhance quality of promotional messages and caller experience. Caller experience may deteriorate due to long IVR (interactive voice response) times. This may result in lost calls leading to lackluster sales and/or service for entities such as advertisers. What is needed is a system and method that incorporates caller feedback in determining relevance of promotional message(s). These and other problems exist.

SUMMARY OF THE INVENTION

Various systems, computer program products, and methods for determining relevance of a promotional message based on caller feedback are described herein.

According to various implementations of the invention, the method may include determining relevance of a promotional message based on caller feedback. The method may include receiving at least one phone call, the at least one phone call indicating a phone number that was called to make the at least one phone call. The method may include associating the at least one phone call with a promotional message or promotional message group via the phone number, the promotional message group comprising one or more promotional messages. The method may include receiving feedback that indicates a user experience associated with the at least one phone call. The method may include determining a relevance of the promotional message or promotional message group based on the received feedback.

DETAILED DESCRIPTION OF THE INVENTION

Figure 1:
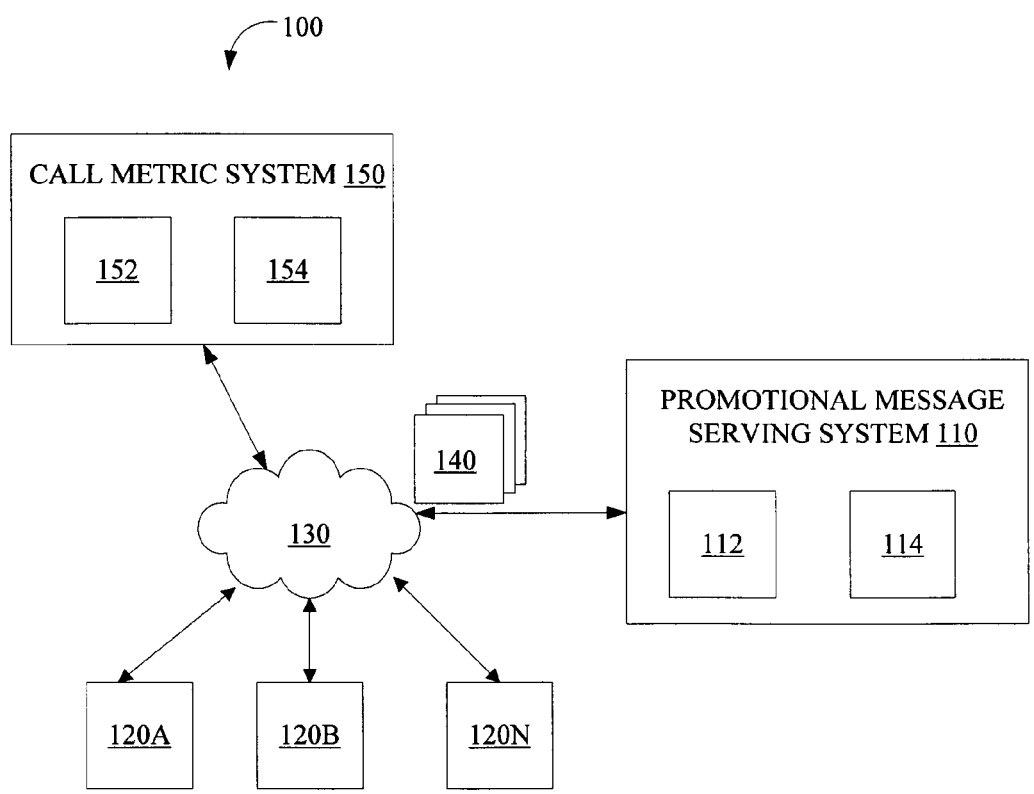
FIG. 1 is a block diagram illustrating a system of determining a relevance of a promotional message based on caller/entity feedback, according to various implementations of the invention.

FIG. 1 is a block diagram illustrating a system 100 of determining a relevance of a promotional message based on caller/entity feedback, according to various implementations of the invention. According to various implementations of the invention, system 100 may include, but is not limited to, a promotional message serving system 110, a call metric system 150 and a computing device 120 (illustrated in FIG. 1 as a plurality of computing devices 120A, 120B, 120N). In some implementations of the invention, promotional message serving system 110, call metric system 150 and computing device 120 may be coupled to one another via a network 130. Network 130 may include a Local Area Network, a Wide Area Network, a cellular communications network, a Public Switched Telephone Network, and/or other network or combination of networks.

According to various implementations of the invention, promotional message serving system 110 may include processor 112, memory 114, and/or other components that facilitate the functions of the promotional message serving system 110 described herein. In some implementations, processor 112 includes one or more processors configured to perform various functions of promotional message serving system 110. In some implementations, memory 114 includes one or more tangible (i.e., non-transitory) computer readable media. Memory 114 may include one or more instructions that when executed by processor 112 configure processor 112 to perform the functions of promotional message serving system 110. In some implementations, memory 114 may include one or more instructions stored on tangible computer readable media that when executed at a remote device, such as computing device 120, cause the remote device to display promotional messages, web pages, and/or other content associated with an entity, and/or perform other functions as described herein.

According to various implementations of the invention, call metric system 150 may include processor 152, memory 154, and/or other components that facilitate the functions of the call metric system 150 described herein. In some implementations, processor 152 includes one or more processors configured to perform various functions of call metric system 150. In some implementations, memory 154 includes one or more tangible (i.e., non-transitory) computer readable media. Memory 154 may include one or more instructions that when executed by processor 152 configure processor 152 to perform the functions of call metric system 150. In some implementations, memory 154 may include one or more instructions stored on tangible computer readable media that when executed at a remote device, such as computing device 120, cause the remote device to display at least one report, and/or perform other functions as described herein.

In some implementations, while promotional message serving system 110 and call metric system 150 have been depicted as separate systems in FIG. 1, it will be appreciated that these systems may be included in one or more systems configured to individually or together perform the functions associated with promotional message serving system 110 and call metric system 150 described herein.

According to various implementations of the invention, computing device 120 may include a computing device such as a desktop computer, a laptop computer, a cellular telephone, a personal digital assistant, a tablet computing device, and/or other computing device on which promotional messages, web pages, and/or other content associated with the entity may be displayed.

In some implementations, promotional message serving system 110 may receive a first request to communicate at least one promotional message. In some implementations, the request may be received from an entity associated with the at least one promotional message. In some implementations, the entity may include an advertiser, retailer and/or any other entity associated with the at least one promotional message.

For example, an entity may include an advertiser that wishes to communicate a promotional message such as an advertisement to a user. In this example, promotional message serving system 110 may receive the advertisement to be communicated to a user on behalf of the advertiser at an appropriate time (such as, without limitation, alongside search engine results, within a webpage, or within a graphical user interface).

In some implementations, the at least one promotional message may be associated with a promotional message group. In some implementations, a promotional message group may be associated with and/or created by the entity. In some implementations, a promotional message group may include one or more promotional messages which target a set of keywords, for example. In some implementations, the set of keywords may include similar or related keywords. In some implementations, the keywords may include one or more letters, numbers, characters, symbols, words, and/or any combination of the foregoing. In some implementations, the keywords may be chosen by the entity. In some implementations, the keywords may be ones that the entity wishes to target such that the one or more promotional messages associated with the promotional message group/entity may be communicated to/displayed at computing device 120 in response to the keywords (for example, in response to a search query that includes the keywords).

An advertiser, for example, may want to promote a product or service in their advertising campaign. In some implementations, the advertiser may create at least one promotional message group associated with the product or service. The advertiser may create the at least one promotional message group using a computing device associated with the advertiser (not otherwise illustrated in FIG. 1). For example, the product that the advertiser wants to promote may be cellular phones. In some implementations, the advertiser may create one or more promotional message groups based on the models of each brand of the cellular phones. In this example, a first promotional message group may be associated with various models of a particular manufacturer of cellular phones, a second promotional message group may be associated with various models of another manufacturer of cellular phones, and so on. In these implementations, each promotional message group may include one or more promotional messages which target a set of keywords associated with the associated models. In other words, each promotional message group may include the associated promotional messages and the associated targeted keywords.

In some implementations, the at least one promotional message/promotional message group may be associated with one or more phone numbers. In some implementations, the one or more phone numbers may be associated with the entity with which the at least one promotional message/promotional message group is associated. In these implementations, for example, the one or more phone numbers may include a phone number of an advertiser such as a phone number of a retail location. In some implementations, the one or more phone numbers may be mapped to the advertiser's phone numbers. In these implementations, for example, the one or more phone numbers may include a phone number that connects to a call center, such as call metric system 150, and that is mapped to the advertiser's phone number. In some implementations, the one or more phone numbers may be associated with a different entity (for example, a phone directory service) that has knowledge of the advertiser's phone numbers and may map the one or more phone numbers to the advertiser's phone numbers. In some implementations, the association(s) may be stored in a memory such as memory 154 of call metric system 150.

In some implementations, promotional message serving system 110 may communicate the at least one promotional message and the associated one or more phone numbers in response to a second request associated with a computing device 120. In some implementations of the invention, the second request includes a request for promotional messages, web pages and/or other electronic content to be communicated to computing device 120. In some implementations, the second request may be related to an application or other process executing at computing device 120. In some implementations, the second request includes one or more search terms (i.e., keywords) from an operator/user of computing device 120 entered into a search engine. The search engine may be a web-based search engine and/or a search engine that searches a hard drive or other component of computing device 120. In some implementations, the second request may be related to an application such as a gaming or other application being displayed at computing device 120. For example, the second request may include a login to an online gaming application accessed using computing device 120. In some implementations, the second request may include location information that indicates a geographic location of computing device 120 (for example, in case the computing device is a portable computing device). Other types of second requests related to applications and/or processes executing at computing device 120 may be received by promotional message serving system 110 as would be appreciated.

In some implementations of the invention, the second request may include one or more keywords entered by a user of computing device 120. In some implementations, based on the second request (i.e., the one or more keywords), promotional message serving system 110 may identify at least one promotional message (associated with at least one promotional message group) to be communicated to and be displayed at computing device 120. In some implementations, promotional message serving system 110 may communicate the identified at least one promotional message and the one or more phone numbers associated with the promotional message. In some implementations, the one or more phone numbers may be included in the at least one promotional message such that the at least one promotional message and the one or more phone numbers are displayed at computing device 120.

In some implementations, promotional message serving system 110 may generate one or more responses 140 to be communicated to and be displayed at computing device 120. In some implementations, a response may include a promotional message associated with an entity, a web page associated with an entity, a landing page associated with an entity, and/or other responses. In some implementations, the entity may include an advertiser, retailer and/or any other entity that is associated with the response. For example, promotional message serving system 110 may generate one or more responses related to: keywords entered by the operator of computing device 120 (such as florist advertisements when the user searches for "online flowers"); a gaming application being played by the operator of computing device 120 (such as a response related to other gaming applications or upgrades to the gaming application being played); the location of computing device 120 (such as advertisements from retailers within walking distance of computing device 120, i.e., in case the computing device is a portable computing device); and/or other responses related to the second request from computing device 120.

In some implementations, a response may be associated with one or more phone numbers. In some implementations, the one or more phone numbers may be associated with the same entity (for example, an advertiser) with which the response is associated. In some implementations, the one or more phone numbers may be mapped to the advertiser's phone numbers. In some implementations, the one or more phone numbers may be associated with a different entity that has knowledge of the advertiser's phone numbers and may map the one or more phone numbers to the advertiser's phone numbers.

In some implementations of the invention, promotional message serving system 110 may generate a response 140 to the second request associated with computing device 120. In some implementations, the one or more phone numbers associated with the response and/or entity may be included in any type of response. For example, a promotional message (for example, an advertisement) may be displayed to user of computing device 120. The user may click on or otherwise select the advertisement which may cause a website associated with the entity to be displayed. The website may have any number of web pages and landing pages associated with it. As such, the one or more phone numbers may be included in the promotional message or any of the web pages and landing pages associated with the website.

In some implementations, the entity may incorporate one or more instructions such as java script code in the website such that when a user selection causes the website to be displayed, the associated one or more phone numbers may be displayed on the website. In other words, when the website is visited, the code is executed and causes the associated one or more phone numbers to be inserted in the web page/landing page. As such, when the web page/landing page is displayed at computing device 120, the associated one or more phone numbers is also displayed. As would be appreciated, other scripting languages may be used as long as the code causes the phone number to be inserted/displayed.

In some implementations of the invention, promotional message serving system 110 may communicate the response to a third party that subsequently communicates the response to computing device 120. In some implementations of the invention, promotional message serving system 110 may communicate the response directly to computing device 120.

In some implementations, the promotional messages may include, but is not limited to, one or more advertisements, one or more coupons, and/or other promotional/marketing content. In some implementations, promotional messages may include various types of formats such as text, image, video, audio, other formats suitable to convey promotional messages, and/or any combination of formats.

As used herein, "selecting" or "selection of" a promotional message includes, but is not limited to, clicking with a finger, a stylus, or other object; shaking or tapping computing device 120 (in the case where the computing device is portable, for example); uttering a verbal command; and/or taking any other action in relation to computing device 120 to indicate a selection of a promotional message.

In some implementations, call metric system 150 may receive at least one phone call indicating a phone number that was called to make the at least one phone call. In some implementations, the phone call may be made using computing device 120. In other implementations, the phone call is made using another device having a telephone function. In some implementations, call metric system 150 may track the received at least one phone call. In some implementations, tracking may include monitoring the duration of the call, area code of the caller associated with the call, date/time of the call, recording the call, transcribing the call (for the advertiser, for example).

In some implementations, call metric system 150 may associate the at least one phone call with a promotional message group via the phone number. In some implementations, call metric system 150 may associate the at least one phone call with the promotional message group based on the association between the promotional message group and the phone number (for example, the association stored in memory 154).

In some implementations, call metric system 150 may track the received at least one phone call by determining that the phone call resulted from a promotional message such as an advertisement, thereby attributing the call to the promotional message. For example, call metric system 150 may receive a phone call from a user that called a phone number that is displayed on an advertisement, landing page, or other content and/or response associated with the entity. Accordingly, when the user calls the phone number, call metric system 150 may determine that the phone call originated from the promotional message based on the association between the phone number and the promotional message. In other words, call metric system 150 may associate the phone call with the promotional message based on the phone number and may determine that the promotional message led to the phone call.

In some implementations, a promotional message/promotional message group may be associated with a phone number before the promotional message and the phone number are communicated to computing device 120. In these implementations, the received at least one phone call may be tracked using the association. The association may be stored in a memory such as memory 154 of call metric system 150. Accordingly, when a user calls the phone number, call metric system 150 may determine that the at least one phone call originated from the promotional message based on the association between the phone number and the promotional message. In some implementations, the promotional message when communicated may include or when selected may cause a phone number to be displayed. Thus, a user may call the phone number after viewing the promotional message. Because the promotional message and the phone number are associated with one another, call metric system 150 may determine that the phone call resulted from the promotional message. Also, because the promotional message is associated with a promotional message group, call metric system 150 may determine that the phone call resulted from (or is associated with) the promotional message group.

In some implementations, the promotional message may be associated with an entity such as an advertiser and a phone number may be associated with the entity. In these implementations, the at least one phone call may be tracked by correlating when the promotional message was communicated and when a phone call associated with the phone number was received. As would be appreciated, for example, based on the date/time that the promotional message was communicated and the date/time that the phone call was received, various statistical analyses may be performed to determine that the phone call is correlated with (i.e., resulted from) the promotional message (in other words, that the promotional message led to the phone call). Also, because the promotional message is associated with a promotional message group, call metric system 150 may determine that the phone call resulted from (or is associated with) the promotional message group.

In some implementations, the phone number may be associated with at least one keyword (i.e., keywords targeted by an entity, for example) such that the promotional message associated with the entity may be displayed in response to a keyword. In these implementations, the at least one phone call may be tracked by correlating when the keyword was entered, when the promotional message was communicated and when a phone call associated with the phone number was received. As would be appreciated, for example, based on the date/time that the keyword was entered, the date/time that the promotional message was communicated and the date/time that the phone call was received, various statistical analyses may be performed to determine that the phone call is correlated with (i.e., resulted from) the keyword and/or promotional message (in other words, that the keyword and/or promotional message led to the phone call). Also, because the keyword and/or promotional message is associated with a promotional message group, call metric system 150 may determine that the phone call resulted from (or is associated with) the promotional message group.

In some implementations, call metric system 150 may establish a connection between a caller associated with the at least one phone call and an entity associated with the promotional message/promotional message group. In some implementations, call metric system 150 may establish a connection based on the received at least one phone call. In some implementations, establishing a connection may include forwarding the call to the entity, dialing the entity and bridging the call, etc.

In some implementations, call metric system 150 may receive a first feedback that indicates a user/caller experience associated with the at least one phone call. In some implementations, the first feedback may be received after the established connection is completed between the caller and the entity. In some implementations, the received first feedback may include a positive feedback indicating a positive user/caller experience associated with the at least one phone call. In some implementations, the received first feedback may include a negative feedback indicating a negative user/caller experience associated with the at least one phone call.

In some implementations, call metric system 150 may provide one or more surveys and/or questionnaires to the caller associated with the at least one phone call to elicit the first feedback from the caller. In some implementations, the surveys may be provided after the at least one phone call is finished between the caller and the entity associated with the promotional message/promotional message group. In some implementations, the surveys may comprise one or more questions regarding the caller's experience with the at least one phone call. In other words, the surveys may elicit feedback regarding the user's perceived quality of the at least one phone call. For example, the surveys may include questions such as, for example, "how would you rate the quality of your call?", "were you satisfied with the quality of your call?" or "how long did you have to wait before your call was answered?" In some implementations, the surveys may include IVR (Interactive Voice Response) based surveys, web based surveys, and/or other surveys.

In some implementations, call metric system 150 may receive one or more survey responses from a caller associated with the at least one phone call (in response to the one or more surveys). In some implementations, the first feedback comprises the one or more survey responses.

In some implementations, the caller may provide the survey responses using computing device 120. In some implementations, computing device 120 may include a user interface (not otherwise illustrated in FIG. 1) that is configured to receive the surveys from call metric system 150 and present the surveys/questions to the caller in order to elicit feedback from the caller. In some implementations, the user interface may present the surveys that prompt for and receive input from the caller regarding the caller's experience with the at least one phone call.

In some implementations, the responses to the surveys may include a multiple choice format and/or open character input. In some implementations, the responses may include ratings and may be numeric such as a rating on a scale of 0-5 of a quality of a phone call, descriptive such as "poor," "below average," "average," "good," "excellent" and so forth, and/or other ratings that reflect a the caller's experience with the at least one phone call. In some implementations, the responses may include open-ended responses such as comments to be entered by the caller.

In some implementations, the caller's survey responses may indicate a positive feedback indicating a positive caller experience associated with the at least one phone call. In some implementations, the caller's survey responses may indicate a negative feedback indicating a negative caller experience associated with the at least one phone call.

In some implementations, a caller may disconnect the phone call before completing the survey (i.e., before providing survey responses) or may otherwise choose not to complete the survey (i.e., not provide responses). In these implementations, no caller response may indicate at least a "not negative" type of response. In other words, no caller response may indicate that at least the caller did not have a negative caller experience associated with the at least one phone call. This is because it may be assumed that if the caller had a negative caller experience, the caller may have chosen to provide feedback rather than no feedback.

In some implementations, call metric system 150 may receive a second feedback from an entity associated with the promotional message/promotional message group. In some implementations, the second feedback may indicate an entity experience associated with the at least one phone call.

In some implementations, call metric system 150 may provide one or more entity surveys and/or questionnaires to the entity such as an advertiser associated with the at least one phone call to elicit the second feedback from the entity. In some implementations, the entity surveys may be provided after the at least one phone call is finished between the caller and the entity associated with the promotional message/promotional message group. In some implementations, the entity surveys may comprise one or more questions regarding the entity's experience with the at least one phone call. In other words, the entity surveys may elicit feedback regarding the entity's perceived quality of the at least one phone call. For example, the entity surveys may include questions such as, for example, "how would you rate the quality of the call?", or "did the customer seem satisfied with the quality of the call?" In some implementations, the entity surveys may include IVR (Interactive Voice Response) based surveys, web based surveys, and/or other surveys.

In some implementations, call metric system 150 may receive one or more entity survey responses from an entity associated with the at least one phone call. In some implementations, the second feedback comprises the one or more entity survey responses.

In some implementations, the entity may provide the entity survey responses using a computing device (not otherwise illustrated in FIG. 1) associated with the entity. In some implementations, the computing device associated with the entity may include a user interface that is configured to receive the entity surveys from call metric system 150 and present the entity surveys/questions to the entity in order to elicit feedback from the entity. In some implementations, the user interface may present the entity surveys that prompt for and receive input from the entity regarding the entity's experience with the at least one phone call.

In some implementations, the entity responses to the entity surveys may include a multiple choice format and/or open character input. In some implementations, the entity responses may include ratings and may be numeric such as a rating on a scale of 0-5 of a quality of a phone call, descriptive such as "poor," "below average," "average," "good," "excellent" and so forth, and/or other ratings that reflect the entity's experience with the at least one phone call. In some implementations, the entity responses may include open-ended responses such as comments to be entered by the entity.

In some implementations, after the at least one phone call is finished between the caller and the entity, the entity may automatically provide the second feedback via the user interface. For example, the user interface may include a button such as "provide feedback" button, which when selected by the entity may prompt or otherwise allow the entity to provide the second feedback.

In some implementations, the entity's survey responses may indicate a positive feedback indicating a positive entity experience associated with the at least one phone call. In some implementations, the entity's survey responses may indicate a negative feedback indicating a negative entity experience associated with the at least one phone call.

In some implementations, in addition to or instead of receiving first and/or second feedback from the caller and/or entity, call metric system 150 may record the at least one phone call and may analyze the recorded phone call to determine a third feedback that indicates a user/caller experience and/or entity experience associated with the phone call. In some implementations, the recorded at least one phone call may be manually analyzed (for example, by professional raters that listen to the recordings). In some implementations, the recording may be input into speech recognition and/or machine learning systems that analyze the recorded at least one phone call. In some implementations, these systems may translate speech to text and may identify patterns in the speech to determine a caller and/or entity experience associated with at least one phone call. In some implementations, both manual and automated mechanisms may be utilized to determine the third feedback regarding a caller and/or entity experience associated with the phone call.

In some implementations, the recorded at least one phone call may be rated and the third feedback may be provided in the form of one or more ratings such as a numeric, descriptive, or other ratings. For example, the recorded at least one phone call may be rated as a "good call" indicating a positive caller/entity experience associated with the call. The recorded at least one phone call may be rated as a "bad call" indicating a bad caller/entity experience associated with the call. The recorded at least one phone call may be rated as a "neutral call" indicating a neutral or non-negative caller/entity experience associated with the call.

In some implementations, call metric system 150 may determine a relevance of the promotional message/promotional message group based on the received feedback (i.e., first feedback, second feedback, third feedback, and/or other feedback) associated with the at least one phone call. In other words, the received feedback may be used to determine whether a particular promotional message/promotional message group that led to the at least one phone call is relevant to the caller and/or entity associated with the at least one phone call. In some implementations, a determination of relevance may be made based on a type of received feedback (for example, positive/good, negative/bad, neutral/non-negative, and/or other type of feedback) associated with the at least one phone call and/or analysis (manual or automated) of the at least one phone call. In some implementations, a determination may be made that the promotional message/promotional message group is relevant to caller/entity based on a positive feedback associated with the at least one phone call. In some implementations, determining a relevance may include determining a higher relevance for the promotional message/promotional message group based on the positive feedback compared to a relevance before the positive feedback. In some implementations, a determination may be made that the promotional message/promotional message group is not relevant to caller/entity based on a negative feedback associated with the at least one phone call. In some implementations, determining a relevance may include determining a lower relevance for the promotional message/promotional message group based on the negative feedback compared to a relevance before the negative feedback.

In some implementations, determining a relevance of a promotional message group may be based on a determined relevance of one or more promotional messages associated with the promotional message group.

In some implementations, based on the determined relevance of a promotional message, call metric system 150 may increase or decrease pCTRs (predicted click through rates) associated with the promotional message. For example, if the promotional message is determined to be relevant or of higher relevance based on positive feedback, the pCTR for the promotional message may be increased. Similarly, if the promotional message is determined to be relevant or of lower relevance based on negative feedback, the pCTR for the promotional message may be decreased. In some implementations, the pCTR for one or more promotional messages included in the promotional message group may be increased or decreased based on the determined relevance. In some implementations, promotional messages with higher pCTRs may be ranked higher than promotional messages with lower pCTRs. In some implementations, the relevance of the promotional message group may be based on the pCTR values of the associated promotional messages.

In some implementations, call metric system 150 may associate a weight with each of one or more promotional messages included in the promotional message group. In some implementations, the weight associated with each promotional message may be based on a probability that the promotional message may led to a phone call. For example, a particular promotional message may be associated with a higher weight in response to a determination that there is a higher probability that the promotional message may lead to a phone call as compared to another promotional message with a lower probability.

In some implementations, call metric system 150 may generate a quality score that is used to determine relevance of a promotional message/promotional message group. In some implementations, the quality score may include a quality score per impression of a promotional message. In some implementations, the quality score may include an average quality score per promotional message group. In some implementations, call metric system 150 may distribute the quality score among the one or more promotional messages associated with the promotional message group based on the assigned weight. In some implementations, the quality score may be distributed uniformly among the promotional messages associated with the promotional message group. In some implementations, the quality score may be distributed based on a weighted average.

In some implementations, call metric system 150 may determine a relevance of the promotional message based on the quality score associated with the promotional message. In some implementations, call metric system 150 may determine a relevance of the promotional message group based on the quality score associated with the promotional message group. For example, a higher quality score may result in a determination of a higher relevance of the promotional message/promotional message group. Similarly, a lower quality score may result in a determination of a lower relevance of the promotional message/promotional message group.

In some implementations, call metric system 150 may determine whether to provide the phone number to be displayed on at least one promotional message of the one or more promotional messages associated with the promotional message group based on the determined relevance of the promotional message/promotional message group. In some implementations, when the promotional message/promotional message group is determined to be relevant or of higher relevance to the caller/entity, a determination may be made to continue displaying the phone number on the at least one promotional message (i.e., continue displaying the phone number when the promotional message is subsequently communicated). In some implementations, when the promotional message/promotional message group is determined to be not relevant or of lower relevance to the caller/entity, a determination may be made to discontinue displaying the phone number on the at least one promotional message. In this manner, whether to display a phone number may be based on a determined relevance, which in turn may be based on caller feedback described herein.

For example, an advertiser may want keywords "coffee" and "coffee machine" to be targeted such that at least one promotional message associated with the promotional message group/entity may be communicated to/displayed at computing device 120 in response to the keywords (for example, in response to a search query that includes the keywords). The at least one promotional message and associated one or more phone numbers may be communicated to computing device 120. A caller (associated with computing device 120 or other device) may make at least one phone call via at least one phone number of the one or more phone numbers. Based on a first phone number associated with a first phone call, a determination may be made that the keyword "coffee" or the promotional message communicated in response to the keyword "coffee" led to the first phone call. Based on a second phone number associated with a second phone call, a determination may be made that the keyword "coffee machine" or the promotional message communicated in response to the keyword "coffee machine" led to the second phone call. The caller/entity may not be happy about the experience associated with the first phone call and may provide negative feedback, thereby resulting in lower relevance being determined for the promotional message/promotional message group associated with the first phone call. In response to the determined lower relevance, a determination may be made to discontinue displaying the first phone number on the promotional message communicated in response to the keyword "coffee". On the other hand, the caller/entity may be happy about the experience associated with the second phone call and may provide positive feedback, thereby resulting in higher relevance being determined for the promotional message/promotional message group associated with the second phone call. In response to the determined higher relevance, a determination may be made to continue displaying the second phone number on the promotional message communicated in response to the keyword "coffee machine". In this example, the first phone call and the second phone call may be associated with the same promotional message group. In some implementations, phone calls received by call metric system 150 may be associated with different promotional message groups.

In some implementations, call metric system 150 may generate at least one report. In some implementations, the report may include, among other things, the number of received calls for a promotional message, promotional message group and/or entity, type of feedback received for one or more promotional messages associated with one or more promotional message groups, the relevance/quality score/rank of one or more promotional messages associated with one or more promotional message groups. In some implementations, the report may include other metrics associated with the calls as would be appreciated.

In some implementations, call metric system 150 may receive a request for the report from an advertiser or other entity. In response to the request, call metric system 150 may generate the report and communicate the report to a remote computing device used by an advertiser (not otherwise illustrated in FIG. 1).

Figure 2:
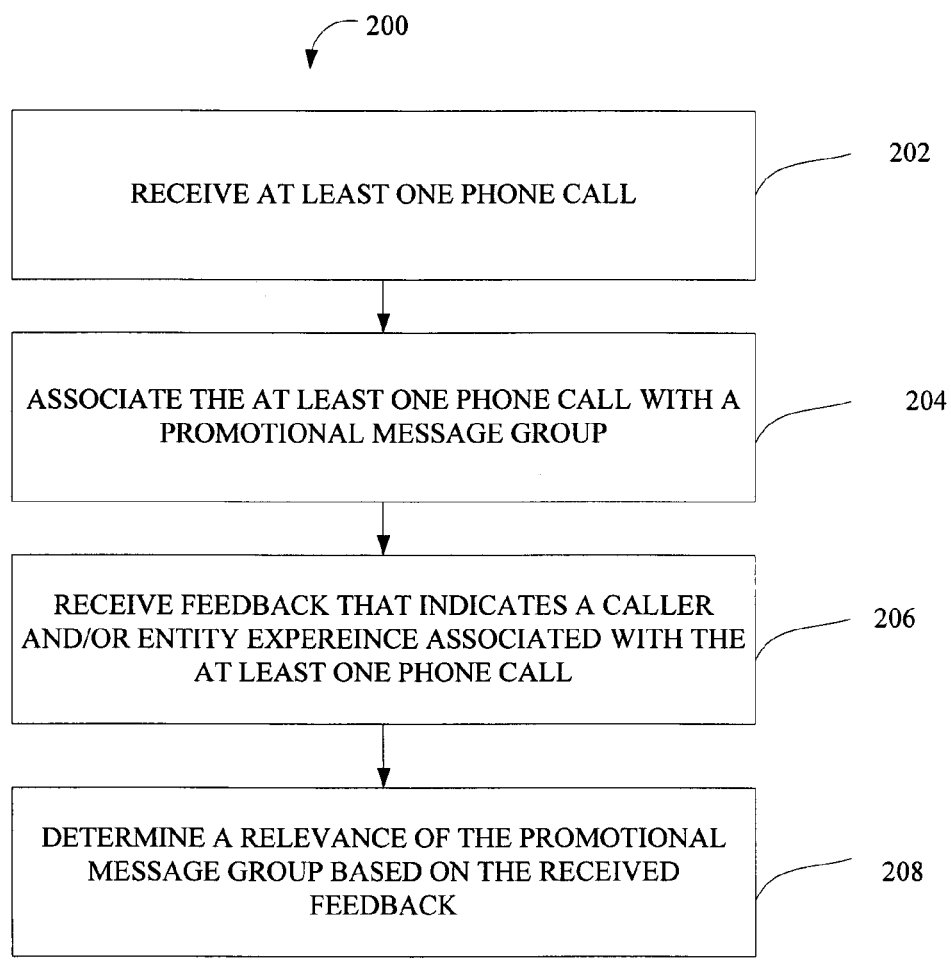
FIG. 2 is a flow diagram illustrating an example process of determining a relevance of a promotional message based on caller/entity feedback, according to various implementations of the invention.

FIG. 2 is a flow diagram illustrating an example process 200 of determining a relevance of a promotional message based on caller/entity feedback, according to various implementations of the invention. The various processing operations and/or data flows depicted in FIG. 2 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, process 200 may receive at least one phone call in operation 202. In some implementations, the at least one phone call may indicate a phone number that was called to make the at least one phone call.

In an operation 204, process 200 may associate the at least one phone call with a promotional message group via the phone number. In some implementations, a promotional message group may be associated with and/or created by an entity (for example, an advertiser, retailer, or other entity). In some implementations, a promotional message group may include one or more promotional messages which target a set of keywords, for example. In some implementations, the set of keywords may include similar or related keywords. In some implementations, the keywords may include one or more letters, numbers, characters, symbols, words, and/or any combination of the foregoing. In some implementations, the keywords may be chosen by the entity.

In an operation 206, process 200 may receive feedback that indicates a caller and/or entity experience associated with the at least one phone call. In an operation 208, process 200 may determine a relevance of the promotional message group based on the received feedback.

Figure 3:
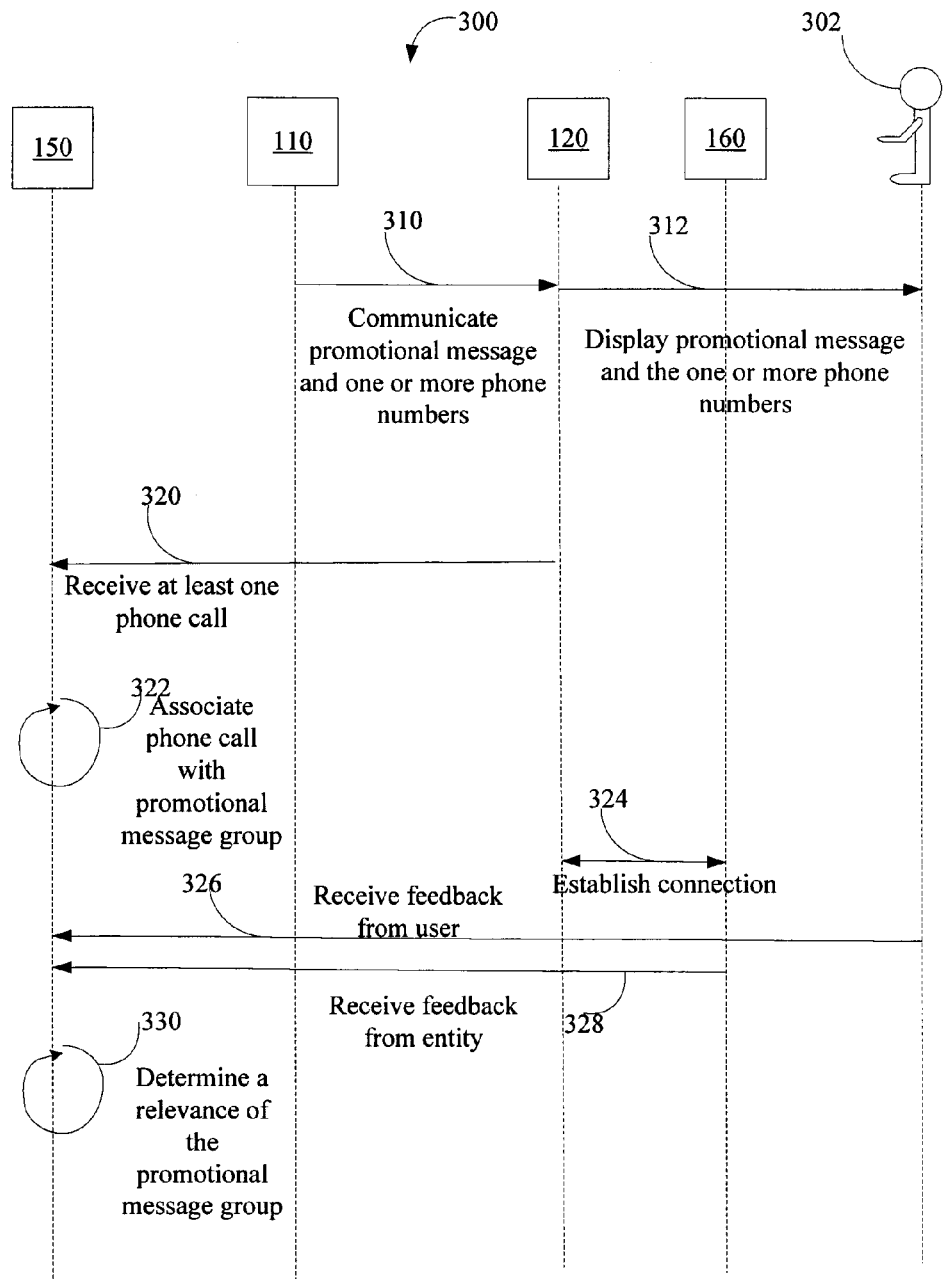
FIG. 3 is a data flow diagram illustrating process relationships in a system of determining a relevance of a promotional message based on caller/entity feedback, according to various implementations of the invention.

FIG. 3 is a data flow diagram 300 illustrating example process relationships in a system of determining a relevance of a promotional message based on caller/entity feedback, according to various implementations of the invention.

According to various implementations of the invention, in an operation 310, promotional message serving system 110 may communicate at least one promotional message (associated with a promotional message group, for example) and the associated one or more phone numbers to computing device 120. In some implementations, promotional message serving system 110 may communicate the least one promotional message and the associated one or more phone numbers in response to a second request. In some implementations, promotional message serving system 110 may identify the at least one promotional message to be communicated based on the second request. In some implementations, in an operation 312, the at least one promotional message and the one or more phone numbers may be displayed at computing device 120 and may be viewed by user 302 of computing device 120.

In some implementations, user 302 may call at least one phone number of the one or more phone numbers associated with the at least one promotional message. In some implementations, in an operation 320, call metric system 150 may receive at least one phone call from computing device 120 or other device used by user 302 to make the call. In some implementations, in an operation 322, call metric system 150 may associate the at least one phone call with the promotional message/promotional message group.

In some implementations, in an operation 324, call metric system 150 may establish a connection between computing device 120 associated with user 302 and entity 160 associated with the promotional message/promotional message group. In some implementations, call metric system 150 may establish the connection based on the received at least one phone call.

In some implementations, in an operation 326, call metric system 150 may receive feedback from user 302 indicating the user's experience associated with the at least one phone call. In some implementations, in an operation 328, call metric system may receive feedback from entity 160 indicating the entity's experience associated with the at least one phone call.

In some implementations, in an operation 330, call metric system 150 may determine a relevance of the promotional message/promotional message group based on the received user and/or entity feedback.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method for determining relevance of an online promotional message based on caller feedback, the method comprising:
   receiving a phone call at a first phone number,
   receiving an indication of a second phone number that was called, in response to delivery, to a user device, of the online promotional message by a promotional message serving system, to initiate the phone call received at the first phone number, wherein the online promotional message included the second phone number, the second phone number is mapped to the first phone number, and the second phone number is different than the first phone number;
   identifying, based on the second phone number and from a plurality of promotional messages or promotional message groups, the online promotional message or a promotional message group that was associated with the second phone number prior to the phone call, the promotional message group comprising one or more promotional messages, including the online promotional message;
   receiving feedback that indicates a user satisfaction with the phone call; and
   determining a relevance of the online promotional message or the promotional message group associated with the second phone number based on the received feedback.

2. The computer-implemented method of claim 1, further comprising:
   recording the phone call; and
   analyzing the recorded phone call, wherein determining a relevance further comprises determining a relevance based on the analyzed phone call.

3. The computer-implemented method of claim 1, wherein receiving feedback further comprises:
   receiving second feedback from an entity associated with the online promotional message or the promotional message group, the second feedback indicating an entity experience associated with the phone call.

4. The computer-implemented method of claim 1, further comprising:
   associating a weight with each of the one or more promotional messages; and
   distributing a quality score among the one or more promotional messages in the promotional message group based on the assigned weight, wherein determining a relevance is based on the quality score.

5. The computer-implemented method of claim 1, wherein the received feedback comprises a positive feedback indicating a positive user experience associated with the phone call, and wherein determining a relevance further comprises:
   determining a higher relevance for the online promotional message or the promotional message group based on the positive feedback compared to a relevance before the positive feedback.

6. The computer-implemented method of claim 1, wherein the received feedback comprises a negative feedback indicating a negative user experience associated with the phone call, and wherein determining a relevance further comprises:
  determining a lower relevance for the online promotional message or the promotional message group based on the negative feedback compared to a relevance before the negative feedback.

7. The computer-implemented method of claim 1, further comprising:
  determining whether to provide the second phone number to be displayed on at least one promotional message of the one or more promotional messages based on the determined relevance.

8. The computer-implemented method of claim 1, further comprising:
  establishing a connection between a caller associated with the phone call and an entity associated with the online promotional message or the promotional message group.

9. The computer-implemented method of claim 1, wherein the second phone number is one of a plurality of phone numbers that are mapped to the first phone number.

10. The computer-implemented method of claim 1, wherein the phone call is received at a call metric system and wherein the first phone number is an advertiser's phone number and the second phone number is mapped to the advertiser's phone number.

11. A system for determining relevance of an online promotional message based on caller feedback, the system comprising:
  one or more processors configured to:
  receive a phone call at a first phone number,
  receive an indication of a second phone number that was called, in response to delivery, to a user device, of the online promotional message by a promotional message serving system, to initiate the phone call received at the first phone number, wherein the online promotional message included the second phone number, the second phone number is mapped to the first phone number, and the second phone number is different than the first phone number;
  identify, based on the second phone number and from a plurality of promotional messages or promotional message groups, the online promotional message or a promotional message group that was associated with the second phone number prior to the phone call, the promotional message group comprising one or more promotional messages, including the online promotional message;
  receive feedback that indicates a user satisfaction with the phone call; and
  determine a relevance of the online promotional message or the promotional message group associated with the second phone number based on the received feedback.

12. The computer-implemented system of claim 11, wherein the one or more processors are further configured to:
  record the phone call; and
  analyze the recorded phone call, wherein the one or more processors configured to determine a relevance further comprise one or more processors configured to determine a relevance based on the analyzed phone call.

13. The computer-implemented system of claim 11, wherein the one or more processors configured to receive feedback further comprise one or more processors configured to:
  receive second feedback from an entity associated with the online promotional message or the promotional message group, the second feedback indicating an entity experience associated with the phone call.

14. The computer-implemented system of claim 11, wherein the one or more processors are further configured to:
  associate a weight with each of the one or more promotional messages; and
  distribute a quality score among the one or more promotional messages in the promotional message group based on the assigned weight, wherein determining a relevance is based on the quality score.

15. The computer-implemented system of claim 11, wherein the received feedback comprises a positive feedback indicating a positive user experience associated with the phone call, and wherein the one or more processors configured to determine a relevance further comprise one or more processors configured to:
  determine a higher relevance for the online promotional message or the promotional message group based on the positive feedback compared to a relevance before the positive feedback.

16. The computer-implemented system of claim 11, wherein the received feedback comprises a negative feedback indicating a negative user experience associated with the phone call, and wherein the one or more processors configured to determine a relevance further comprise one or more processors configured to:
  determine a lower relevance for the online promotional message or the promotional message group based on the negative feedback compared to a relevance before the negative feedback.

17. The computer-implemented system of claim 11, wherein the one or more processors are further configured to:
  determine whether to provide the second phone number to be displayed on at least one promotional message of the one or more promotional messages based on the determined relevance.

18. The computer-implemented system of claim 11, wherein the one or more processors are further configured to:
  establish a connection between a caller associated with the phone call and an entity associated with the online promotional message or the promotional message group.

19. The computer-implemented system of claim 11, wherein the second phone number is one of a plurality of phone numbers that are mapped to the first phone number.

20. The computer-implemented system of claim 11, wherein the phone call is received at a call metric system and wherein the first phone number is an advertiser's phone number and the second phone number is mapped to the advertiser's phone number.

* * * * *